United States Patent
Yu et al.

(10) Patent No.: US 10,291,934 B2
(45) Date of Patent: May 14, 2019

(54) MODIFIED HEVC TRANSFORM TREE SYNTAX

(71) Applicant: ARRIS Enterprises, Inc., Suwanee, GA (US)

(72) Inventors: Yue Yu, San Diego, CA (US); Limin Wang, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 421 days.

(21) Appl. No.: 14/504,020

(22) Filed: Oct. 1, 2014

(65) Prior Publication Data

US 2015/0092862 A1   Apr. 2, 2015

Related U.S. Application Data

(60) Provisional application No. 61/885,575, filed on Oct. 2, 2013.

(51) Int. Cl.
| | |
|---|---|
| *H04N 19/60* | (2014.01) |
| *H04N 19/70* | (2014.01) |
| *H04N 19/503* | (2014.01) |
| *H04N 19/61* | (2014.01) |
| *H04N 19/593* | (2014.01) |

(52) U.S. Cl.
CPC ........... *H04N 19/60* (2014.11); *H04N 19/503* (2014.11); *H04N 19/593* (2014.11); *H04N 19/61* (2014.11); *H04N 19/70* (2014.11)

(58) Field of Classification Search
CPC ............................ H04N 19/53; H04N 19/186
See application file for complete search history.

(56) References Cited

U.S. PATENT DOCUMENTS

| | | | | |
|---|---|---|---|---|
| 9,462,282 | B2* | 10/2016 | Sasai | H04N 19/197 |
| 2013/0251026 | A1* | 9/2013 | Guo | H04N 19/90 |
| | | | | 375/240.02 |
| 2013/0266074 | A1* | 10/2013 | Guo | H04N 19/00969 |
| | | | | 375/240.24 |
| 2015/0030067 | A1* | 1/2015 | Zhao | H04N 19/176 |
| | | | | 375/240.02 |

OTHER PUBLICATIONS

B. Bross, et al., "High Efficiency Video Coding (HEVC) text specification draft 10 (for FDIS & Last Call)," Document of Joint Collaborative Team on Video Coding, JCTVC-L1003_v34, 12th Meeting: Geneva, CH, Jan. 14-23, 2013.
PCT International Search Report & Written Opinion, Re: Application No. PCT/U2014/058653, dated Dec. 16, 2014.
Y-K Wang, et al., "High Efficiency Video Coding (HEVC) Defect Report", 14th JCT-VC Meeting, (Joint Collaborative Team on Video Coding of ISO/IEC JTC1/SC29/WG11 and ITU-T SG.16), No. JCTVC-N1003, dated Sep. 27, 2013, pp. 90-91.
"WG14/N1256 Committee Draft, Sep. 7, 2007, ISO/IEC 9899: TC3", Retrieved from the Internet on Dec. 5, 2014 at URL: http://www.open-std.org/jtc1/sc22/wg14/www/docs/n1256.pdf.

* cited by examiner

*Primary Examiner* — Christopher G Findley
(74) *Attorney, Agent, or Firm* — Lori Anne D. Swanson

(57) ABSTRACT

A method, apparatus, article of manufacture, and a memory structure for performing transform tree processing in advanced coding schemes is disclosed. Logical statements having two operands that can result in negative flag indexes have been replaced with conditional multiple logical statements with single operands.

20 Claims, 17 Drawing Sheets

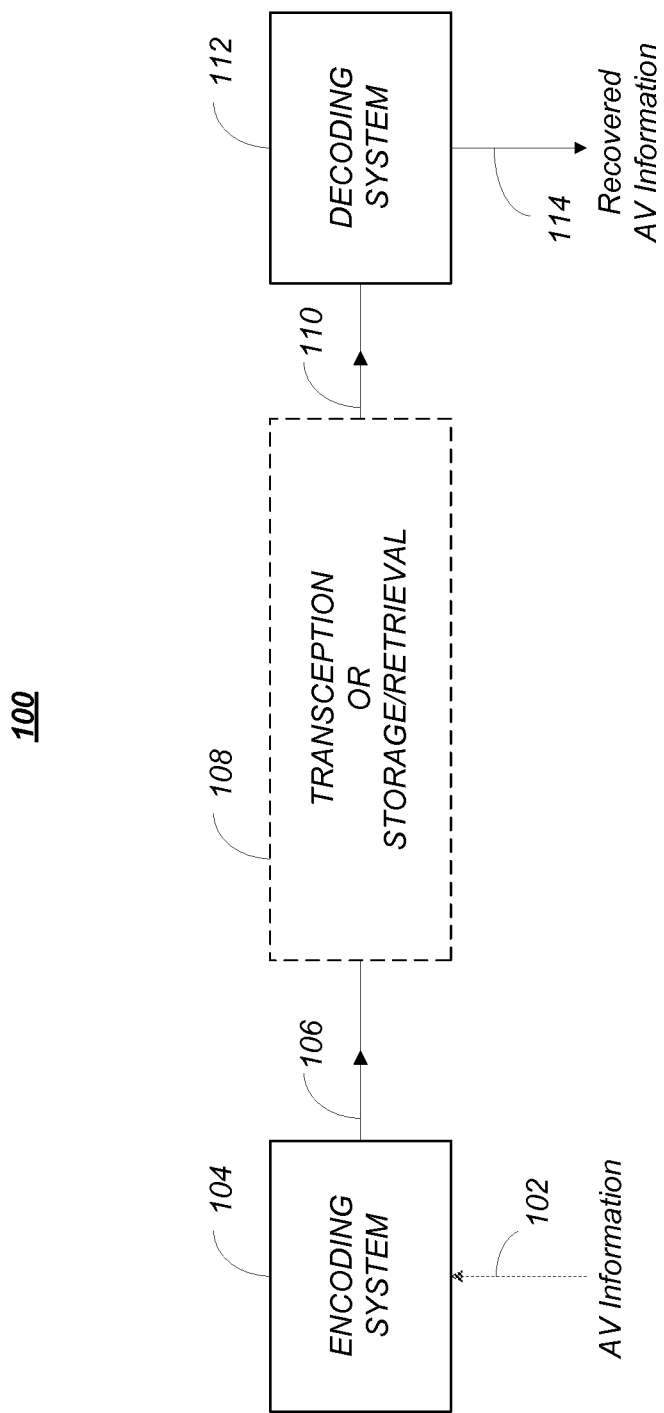

PB (Prediction Blocks)

TB (Transform Blocks)

| | | |
|---|---|---|
| 1302 | transform_tree( x0, y0, xBase, yBase, log2TrafoSize, trafoDepth, blkIdx ) { | Descriptor |
| 1304 | if( log2TrafoSize <= Log2MaxTrafoSize && log2TrafoSize > Log2MinTrafoSize && trafoDepth < MaxTrafoDepth && !( IntraSplitFlag && ( trafoDepth == 0 ) ) ) | |
| 1306 |   split_transform_flag[ x0 ][ y0 ][ trafoDepth ] | ae(v) |
| 1308 | if( log2TrafoSize > 2 ) { | |
| 1310 |   if( trafoDepth == 0 \|\| cbf_cb[ xBase ][ yBase ][ trafoDepth − 1 ] ) | |
| 1312 |     cbf_cb[ x0 ][ y0 ][ trafoDepth ] | ae(v) |
| 1314 |   if( trafoDepth == 0 \|\| cbf_cr[ xBase ][ yBase ][ trafoDepth − 1 ] ) | |
| 1316 |     cbf_cr[ x0 ][ y0 ][ trafoDepth ] | ae(v) |
| 1318 | } | |
| 1320 | if( split_transform_flag[ x0 ][ y0 ][ trafoDepth ] ) { | |
| 1322 |   x1 = x0 + ( 1 << ( log2TrafoSize − 1 ) ) | |
| 1324 |   y1 = y0 + ( 1 << ( log2TrafoSize − 1 ) ) | |
| 1326 |   transform_tree( x0, y0, x0, y0, log2TrafoSize − 1, trafoDepth + 1, 0 ) | |
| 1328 |   transform_tree( x1, y0, x0, y0, log2TrafoSize − 1, trafoDepth + 1, 1 ) | |
| 1330 |   transform_tree( x0, y1, x0, y0, log2TrafoSize − 1, trafoDepth + 1, 2 ) | |
| 1332 |   transform_tree( x1, y1, x0, y0, log2TrafoSize − 1, trafoDepth + 1, 3 ) | |
| 1334 | } else { | |
| 1336 |   if( CuPredMode[ x0 ][ y0 ] == MODE_INTRA \|\| trafoDepth != 0 \|\| cbf_cb[ x0 ][ y0 ][ trafoDepth ] \|\| cbf_cr[ x0 ][ y0 ][ trafoDepth ] ) | |
| 1338 |     cbf_luma[ x0 ][ y0 ][ trafoDepth ] | ae(v) |
| 1340 |   transform_unit( x0, y0, xBase, yBase, log2TrafoSize, trafoDepth, blkIdx ) | |
| 1342 | } | |
| 1344 | } | |

*FIG. 13*

| | | Descriptor |
|---|---|---|
| 1302 | transform_tree( x0, y0, xBase, yBase, log2TrafoSize, trafoDepth, blkIdx ) { | |
| 1304 | if( log2TrafoSize <= Log2MaxTrafoSize && log2TrafoSize > Log2MinTrafoSize && trafoDepth < MaxTrafoDepth && !( IntraSplitFlag && ( trafoDepth == 0 ) ) ) | |
| 1306 | split_transform_flag[ x0 ][ y0 ][ trafoDepth ] | ae(v) |
| 1308 | if( log2TrafoSize > 2 ) { | |
| 1402 | if( trafoDepth == 0 ) | |
| 1404 | cbf_cb[ x0 ][ y0 ][ trafoDepth ] | ae(v) |
| 1406 | else if(cbf_cb[ xBase ][ yBase ][ trafoDepth − 1 ]) | |
| 1408 | cbf_cb[ x0 ][ y0 ][ trafoDepth ] | |
| 1410 | if( trafoDepth == 0 ) | |
| 1412 | cbf_cr[ x0 ][ y0 ][ trafoDepth ] | ae(v) |
| 1414 | else if(cbf_cr[ xBase ][ yBase ][ trafoDepth − 1 ]) | |
| 1416 | cbf_cr[ x0 ][ y0 ][ trafoDepth ] | |
| 1418 | } | |
| 1320 | if( split_transform_flag[ x0 ][ y0 ][ trafoDepth ] ) { | |
| 1322 | x1 = x0 + ( 1 << ( log2TrafoSize − 1 ) ) | |
| 1324 | y1 = y0 + ( 1 << ( log2TrafoSize − 1 ) ) | |
| 1326 | transform_tree( x0, y0, x0, y0, log2TrafoSize − 1, trafoDepth + 1, 0 ) | |
| 1328 | transform_tree( x1, y0, x0, y0, log2TrafoSize − 1, trafoDepth + 1, 1 ) | |
| 1330 | transform_tree( x0, y1, x0, y0, log2TrafoSize − 1, trafoDepth + 1, 2 ) | |
| 1332 | transform_tree( x1, y1, x0, y0, log2TrafoSize − 1, trafoDepth + 1, 3 ) | |
| 1334 | } else { | |
| 1336 | if( CuPredMode[ x0 ][ y0 ] == MODE_INTRA || trafoDepth != 0 || cbf_cb[ x0 ][ y0 ][ trafoDepth ] || cbf_cr[ x0 ][ y0 ][ trafoDepth ] ) | |
| 1338 | cbf_luma[ x0 ][ y0 ][ trafoDepth ] | ae(v) |
| 1340 | transform_unit( x0, y0, xBase, yBase, log2TrafoSize, trafoDepth, blkIdx ) | |
| 1342 | } | |
| 1344 | } | |

*FIG. 14*

MODIFIED HEVC TRANSFORM TREE SYNTAX

CROSS-REFERENCE TO RELATED APPLICATIONS

This application claims benefit of the following U.S. Provisional Patent Application, which is hereby incorporated by reference herein:

Application Ser. No. 61/885,575, entitled "MODIFICATION OF TRANSFORM TREE SYNTAX FOR HEVC," by Yue Yu and Limin Wang, filed Oct. 2, 2013.

BACKGROUND OF THE INVENTION

1. Field of the Invention

The present invention relates to systems and methods for encoding data, and in particular to a system and method for generating and processing slice headers with high efficiency video coded data.

2. Description of the Related Art

There is rapid growth in the technologies associated with the generation, transmission, and reproduction of media programs. These technologies include coding schemes that permit digital versions of the media programs to be encoded to compress them to much smaller size and facilitate their transmission, storage, reception and playback. These technologies have application in personal video recorders (PVRs), video on demand (VOD), multiple channel media program offerings, interactivity, mobile telephony, and media program transmission.

Without compression, digital media programs are typically too large to transmit and/or store for a commercially acceptable cost. However, compression of such programs has made the transmission and storage of such digital media programs not only commercially feasible, but commonplace.

Initially, the transmission of media programs involved low to medium resolution images transmitted over high bandwidth transmission media such as cable television and satellite. However, such transmission has evolved to include lower bandwidth transmission media such as Internet transmission to fixed and mobile devices via computer networks, WiFi, Mobile TV and third and fourth generation (3G and 4G) networks. Further, such transmissions have also evolved to include high definition media programs such as high definition television (HDTV), which have significant transmission bandwidth and storage requirements.

The High Efficiency Video Coding (HEVC) coding standard (or H.265) is the most recent coding standard promulgated by the ISO/IEC MPEG standardization organizations. The coding standard preceding HEVC included the H.262/MPEG-2 and the subsequent H.264/MPEG-4 Advanced Video Coding (AVC) standard. H.264/MPEG-4 has substantially replaced H.262/MPEG-2 in many application including high definition (HD) television. HEVC supports resolutions higher than HD, even in stereo or multi-view embodiments, and is more suitable for mobile devices such as tablet personal computers. Further information regarding HEVC can be found in the publication "Overview of the High Efficiency Video Coding (HEVC) Standard, by Gary J. Sullivan, Jens-Rainer Ohm, Woo Jin Han and Thomas Wiegand, IEEE Transactions on Circuits and Systems for Video Technology, December 2012, and "High Efficiency Video Coding (HEVC) Text Specification Draft 10," by the Joint Collaborative Team on Video Coding (JCT-VC) including Benjamin Bross, Woo-Jin Han, Jens-Rainer Ohm, Gary J. Sullivan, Ye-Kui Wang and Thomas Wiegand, presented at the 12th Meeting, Geneva, Jan. 14-23, 2013 (hereinafter, "HEVC Specification," both of which are hereby incorporated by reference herein.

As in other coding standards, the bitstream structure and syntax of HEVC compliant data are standardized, such that every decoder conforming to the standard will produce the same output when provided with the same input. Some of the features incorporated into the HEVC standard include the definition and processing of coding tree structures used to identify the splitting of units and blocks of data into smaller units and blocks of data. Coding trees are defined according to a quadtree structure. A quadtree is a tree in which a parent node (associated with a coding unit or block) can be split into four child nodes, each of which may become a parent node for another split into four child nodes. Transform trees are tree structures relating to transform units, which comprise residual signals of a CU.

The transform tree structure is signaled in the transform tree syntax described in paragraph 7.3.8.8. of the HEVC Specification. This baseline transform tree structure uses the hierarchical depth of the subject transform unit as an index to a flag describing whether hierarchically adjacent chroma blocks have non-zero coefficients. However the baseline transform tree syntax uses the variable associated with such depth (trafoDepth) as an index to the flag, and this can result in an impermissible and confusing negative index. What is needed is a transform tree syntax that avoids this discrepancy.

SUMMARY OF THE INVENTION

To address the requirements described above, this document discloses a method usable in a processing system for decoding a sequence comprising a plurality of pictures, each of the plurality of pictures partitionable into one or more slices, each of the picture processed at least in part according to a picture parameter set and each of the slices processed at least in part according to a slice header. In one embodiment, the method comprises determining if a slice of the one or more slices is an inter-predicted slice according to slice type data, and if the slice is determined to be an inter-predicted slice, determining if a first parameter is in the slice header, the first parameter associated with a value signaling enablement of a state of weighted prediction of image data associated with the slice. If the first parameter is in the slice header, the first parameter is read and used to perform weighted prediction of the image data according to the read first parameter. Other embodiments are evidenced by a processor having a memory storing instructions for performing the foregoing operations.

In another embodiment the method comprises steps for encoding the sequence described above. The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

Referring now to the drawings in which like reference numbers represent corresponding parts throughout:

FIG. 1 is a diagram depicting an exemplary embodiment of a video coding-decoding system that can be used for transmission and/or storage and retrieval of audio and/or video information;

FIG. 13 is a diagram illustrating a transform tree syntax used to signal transform tree parameters in HEVC;

FIG. 14 is a diagram illustrating an improved transform tree syntax;

DETAILED DESCRIPTION OF PREFERRED EMBODIMENTS

Figure 2A:
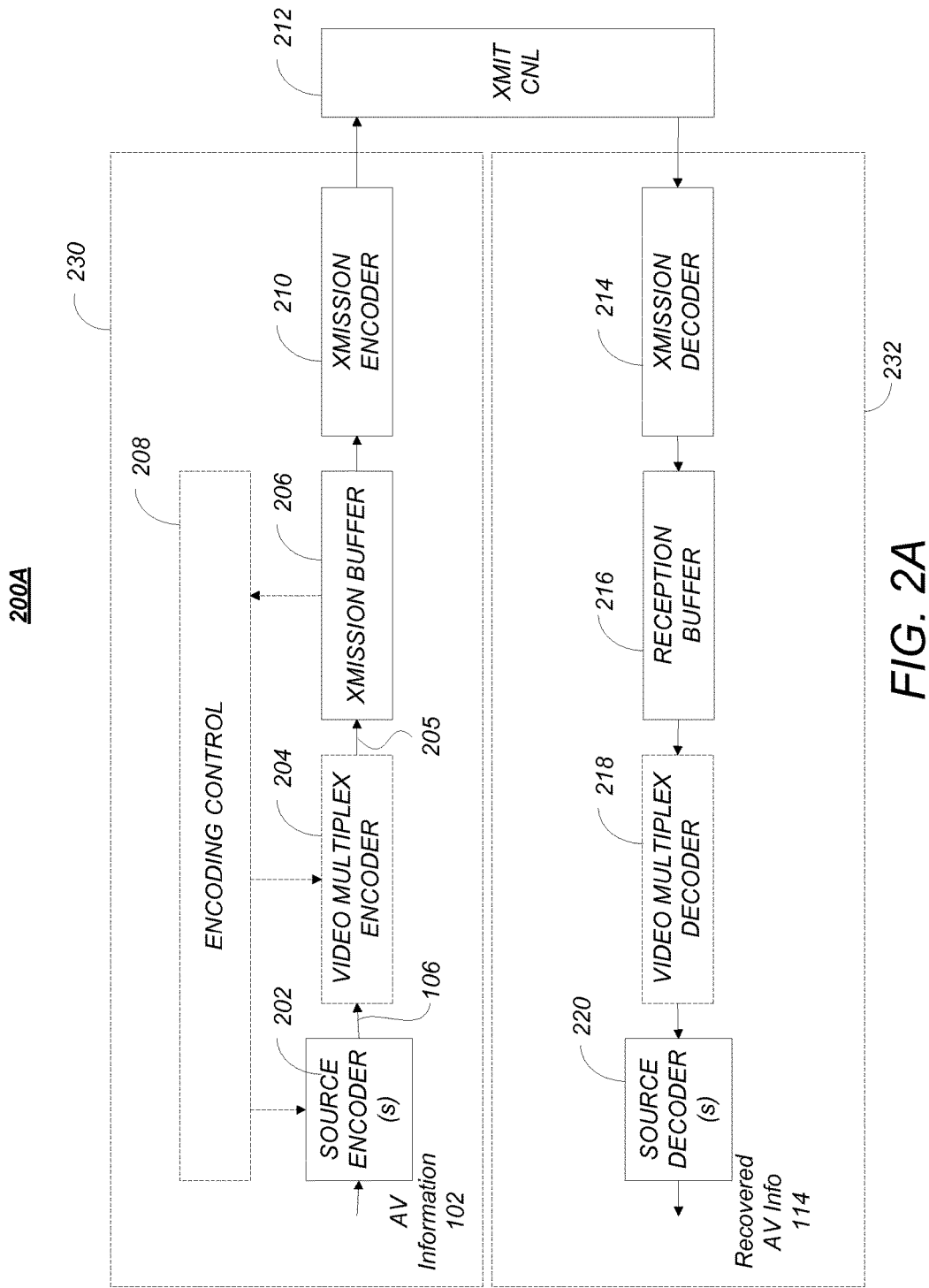
FIG. 2A is a diagram of one embodiment of a codec system in which the encoded AV information is transmitted to and received at another location.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Audio-Visual Information Transception and Storage

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error-correcting systems may be included to reduce or eliminate such errors. For example, the encoded AV information 106 may be forward error correction (FEC) encoded by adding redundant information, and such redundant information can be used to identify and eliminate errors in the reception segment 230.

The transmission segment 102 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 106 according to certain performance parameters that affect the instantaneous bit rate, the signals from each of the source encoders 106 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a coding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
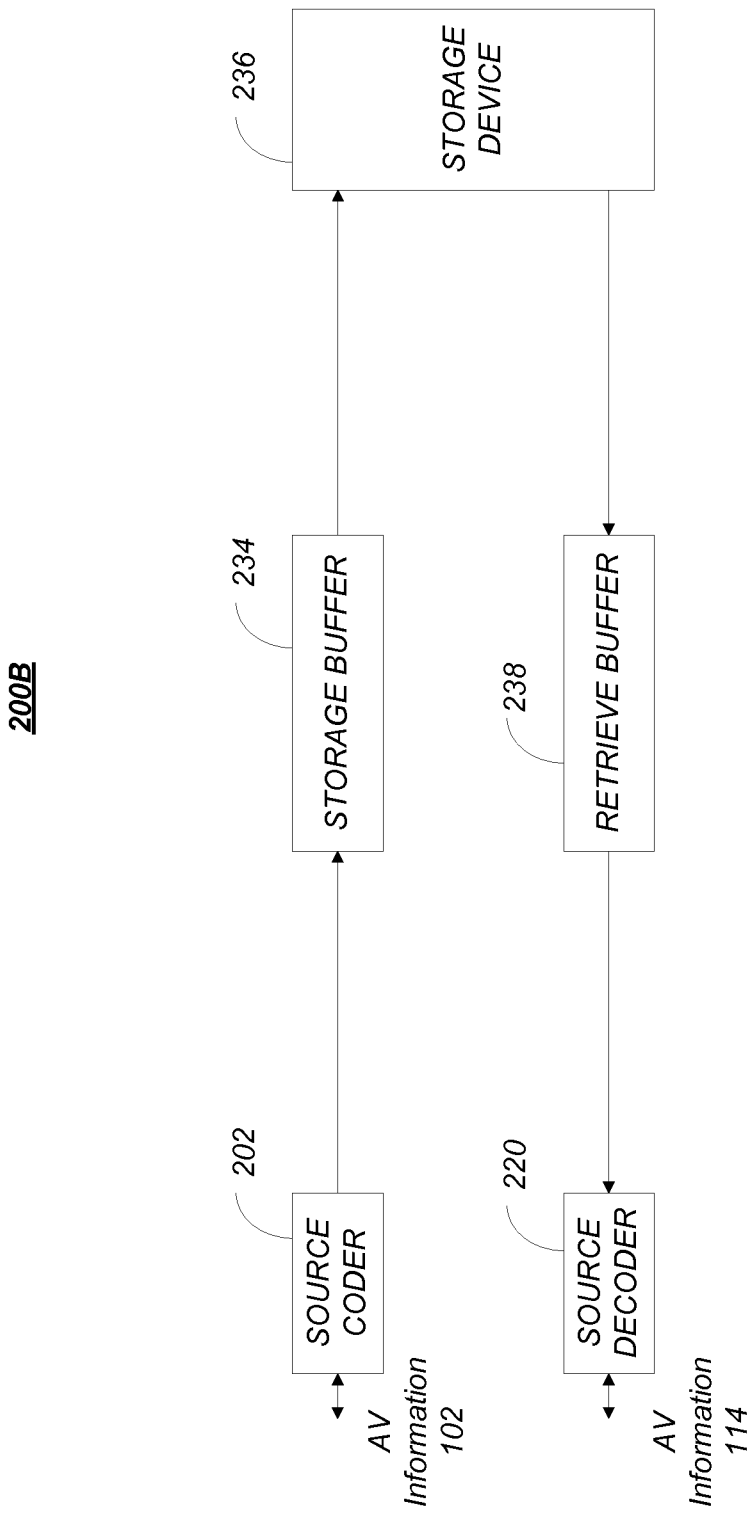
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
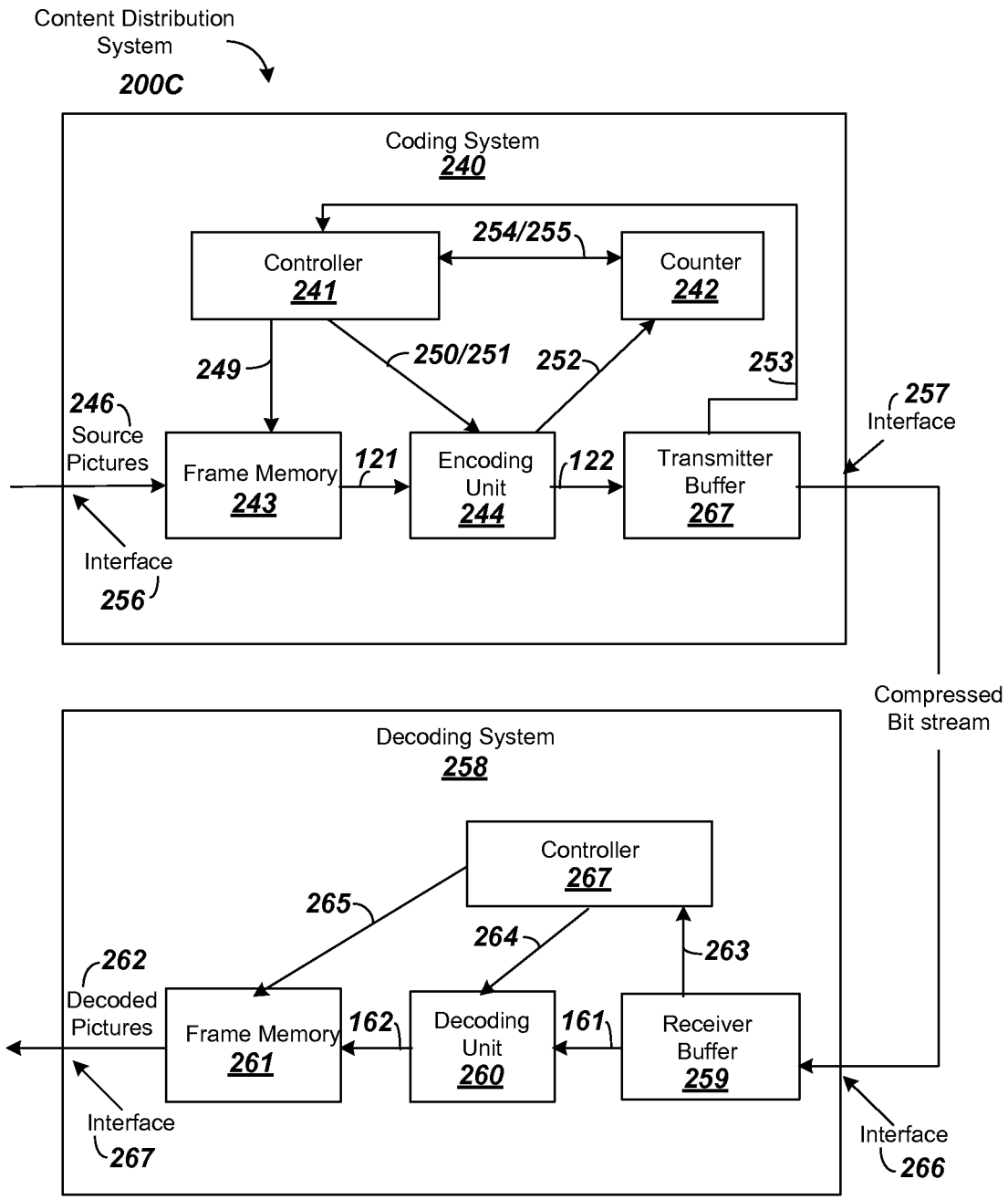

FIG. 2C is another diagram depicting an exemplary content distribution system 200C comprising a coding system or encoder 202 and a decoding system or decoder 220 that can be used to transmit and receive HEVC data. In some embodiments, the coding system 202 can comprise an input interface 256, a controller 241 a counter 242 a frame memory 243, an encoding unit 244, a transmitter buffer 267 and an output interface 257. The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 267 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures utilizing the controller 241. The frame memory 243 can have a first area that can be used for storing the incoming frames from the source pictures 246 and a second area that can be used for reading out the frames and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 202 to start an encoding operation, such as preparing the Coding Units based on a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 267.

The encoded video signal 248, including the generated video compression data, can be stored in the transmitter buffer 267. The information amount counter 242 can be incremented to indicate the total amount of data in the transmitter buffer 267. As data is retrieved and removed from the buffer, the counter 242 can be decremented to reflect the amount of data in the transmitter buffer 267. The occupied area information signal 253 can be transmitted to the counter 242 to indicate whether data from the encoding unit 244 has been added or removed from the transmitter buffer 267 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 267.

The information amount counter 242 can be reset in response to a preset signal 254 generated and output by the controller 241. After the information amount counter 242 is reset, it can count data output by the encoding unit 244 and obtain the amount of video compression data and/or video packets, which have been generated. The information amount counter 242 can supply the controller 241 with an information amount signal 255 representative of the obtained amount of information. The controller 241 can control the encoding unit 244 so that there is no overflow at the transmitter buffer 267.

In some embodiments, the decoding system 220 can comprise an input interface 266, a receiver buffer 259, a controller 267, a frame memory 261, a decoding unit 260 and an output interface 267. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 220. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 263 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 267.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Prior art encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below. CS39543/CS39549/CS39892

Figure 3:
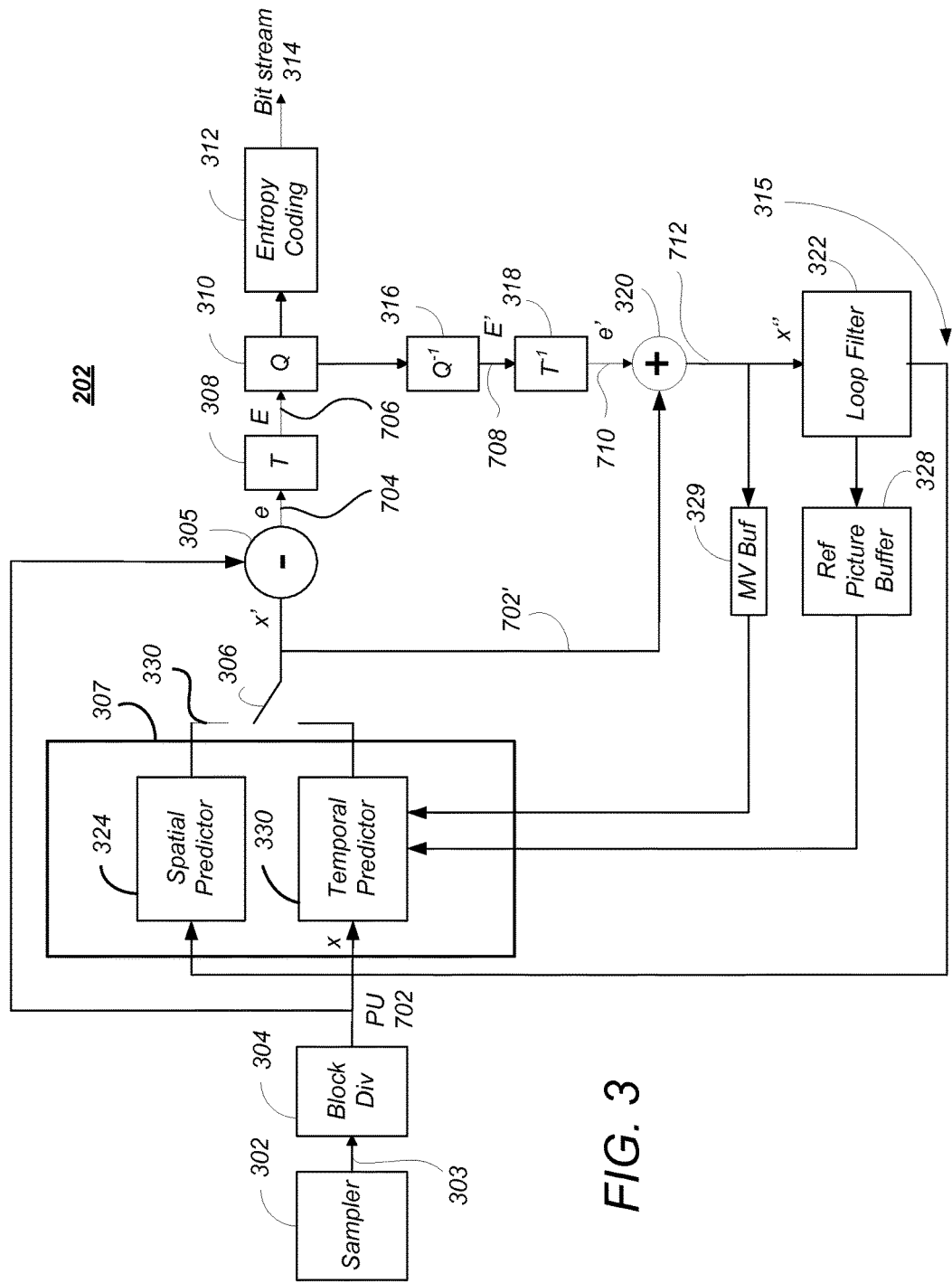
FIG. 3 is a block diagram illustrating one embodiment of the source encoder.

FIG. 3 is a block diagram illustrating one embodiment of the source encoder 202. The source encoder 202 accepts AV information 102 and uses sampler 302 sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks 102, for example 4×4, 4×8, 8×4, 8×8, 8×16, 16×8. HEVC expands and generalizes the notion of the coding entity beyond that of the macroblock.

HEVC Coding Entities: CTU, CTB, CU, CB, PU, PB, TU and TB

Like other video coding standards, HEVC is a block-based hybrid spatial and temporal predictive coding scheme. However, HEVC introduces new coding entities that are not included with H.264/AVC standard. These coding entities include Coding tree units (CTUs), that are comprised of a one or more coding units (CUs), each associated with one or more predictive units (PUs) and one or more transform units (TUs) and are further described below.

Figure 4:
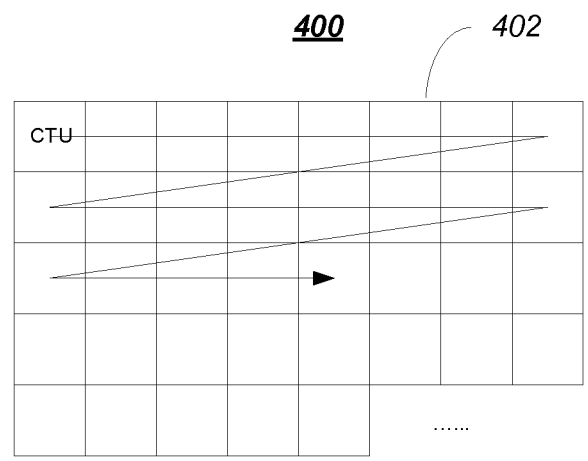
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan, and are signaled in the sequence parameter set, so all CTUs in a video sequence typically have the same size (128×128, 64×64, 32×32 or 16×16).

Figure 5A:
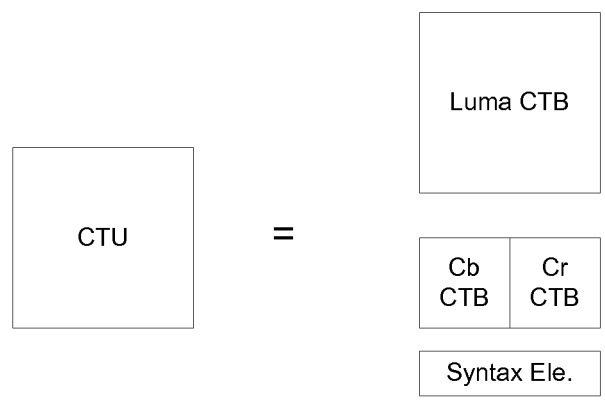
FIGS. 5A-5E provide diagrams showing exemplary partitions of a coding tree block into coding units.

In the HEVC naming convention, "units" indicate coding logical units, which are encoded into the HEVC bit stream, while "blocks" indicate a portion of a video frame buffer where a process using the data is targeted to. Under this convention, a CTU is a logical unit, and each CTU 402 typically consists of three blocks, namely a luma block (Y) and two chroma blocks (Cb and Cr) and associated syntax elements. Each block is called a coding tree block (CTB). This is illustrated in FIG. 5A.

Each CTB is the same size as the related CTU. However, depending on a part of the video frame, the CTU may be too large to determine whether to perform inter-picture or intra-picture prediction. Each CTU can therefore be iteratively divided into smaller variable size CUs (associated coding blocks (CBs)) with each CU becoming the decision making point of what prediction type (inter-picture or intra-picture) will be used. For example, a CTU may be split into 16×16 CUs, while others are split into 8×8 CUs. The iterative division into smaller variable sized coding units is described by "quadtree" decomposition further described below. Coding units are regions formed in the image to which similar encoding parameters are applied and transmitted in the bitstream 314.

Figure 5B:
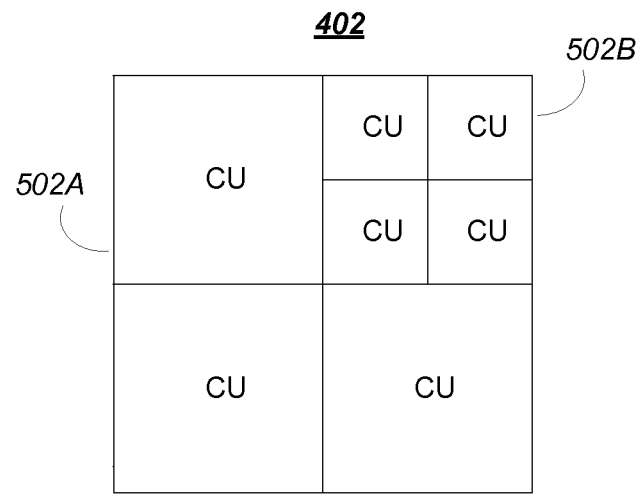

FIG. 5B is a diagram showing an exemplary partition of an CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

Figure 5C:
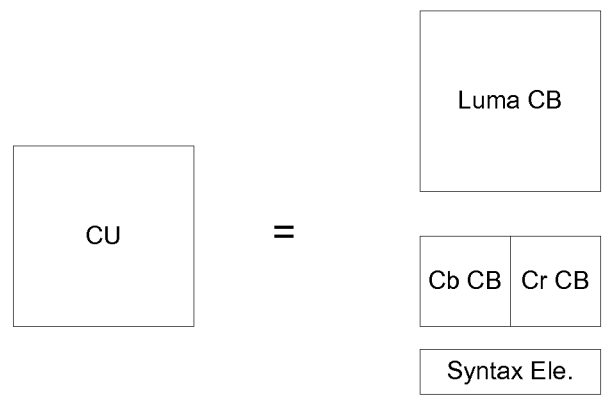

A CB associated with a CU includes three coding blocks (a luma (Y) coding block, and two chroma coding blocks, Cb CB, and Cr CB) and associated syntax elements. This is illustrated in FIG. 5C.

Figure 5D:
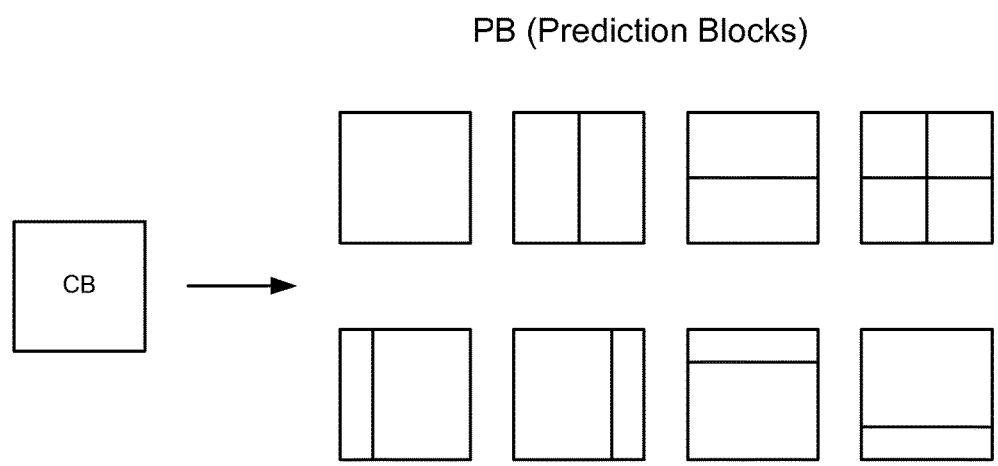

The CB is of sufficiently small size to make a decision whether to use "inter" prediction, but could still be too large to efficiently store motion vectors for such inter prediction or for efficient use of the intra prediction mode. For example, very small objects may be moving within an 8×8 CB (for example, snowflakes), and it may be desirable to use different motion vectors for objects in different parts of the CB. Thus, the notion of a prediction block PB was introduced. Each CB can be split into PBs differently depending on the temporal and/or spatial predictability of the images. FIG. 5D is a diagram illustrating the different potential ways in which a CB may be separated into PUs.

Figure 5E:
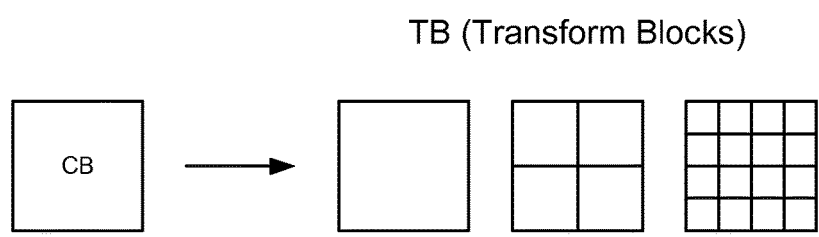

Once the prediction is made, the residual difference between the predicted image and the actual image needs to be coded (for example, using a discrete cosine transform or DCT-like transformation). Again, a CB could be dimensionally too large for this because the minimum sized CB may contain information with detail (high frequency) and flat areas with little detail (low frequency). Therefore each CB can be split into transform blocks (TBs). An exemplary splitting of a CB into TBs is illustrated in FIG. 5E. A TB does not have to be aligned with a PB. It is possible an even common to perform a single transform across residuals from multiple PBs, and vice versa.

Quadtree Structure

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
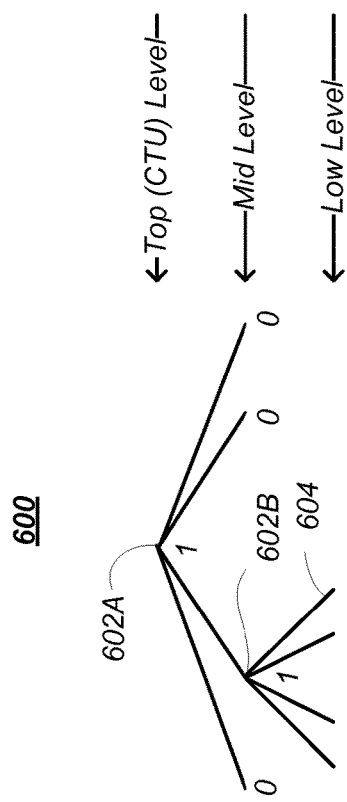
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5B. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5B can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

As described above, CUs 502 correspond to elementary coding elements and include two related sub-units: prediction units (PUs) and a transform units (TUs), both of which have a maximum size equal to the size of the corresponding CU 502.

Figure 7:
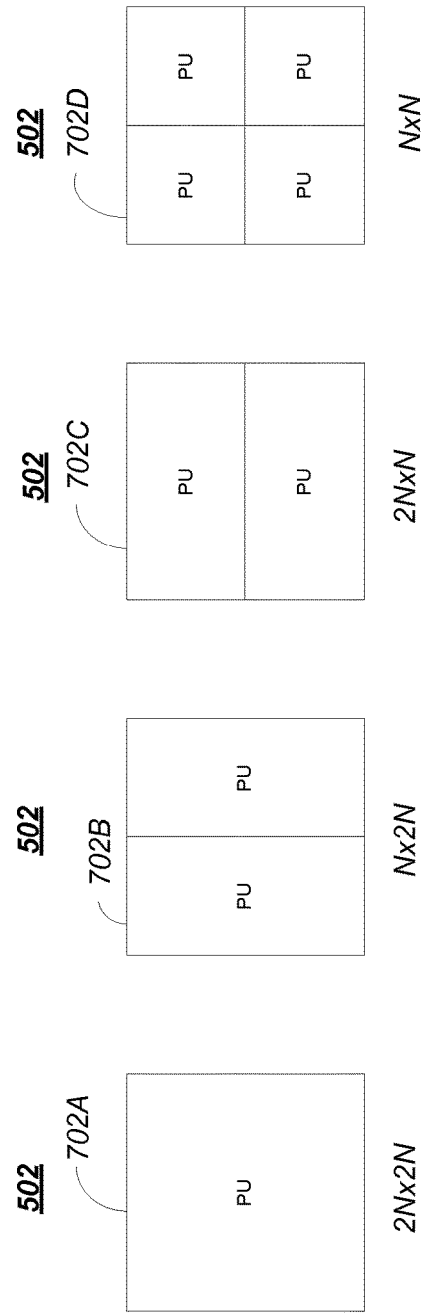
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D)), as shown in FIG. 7.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
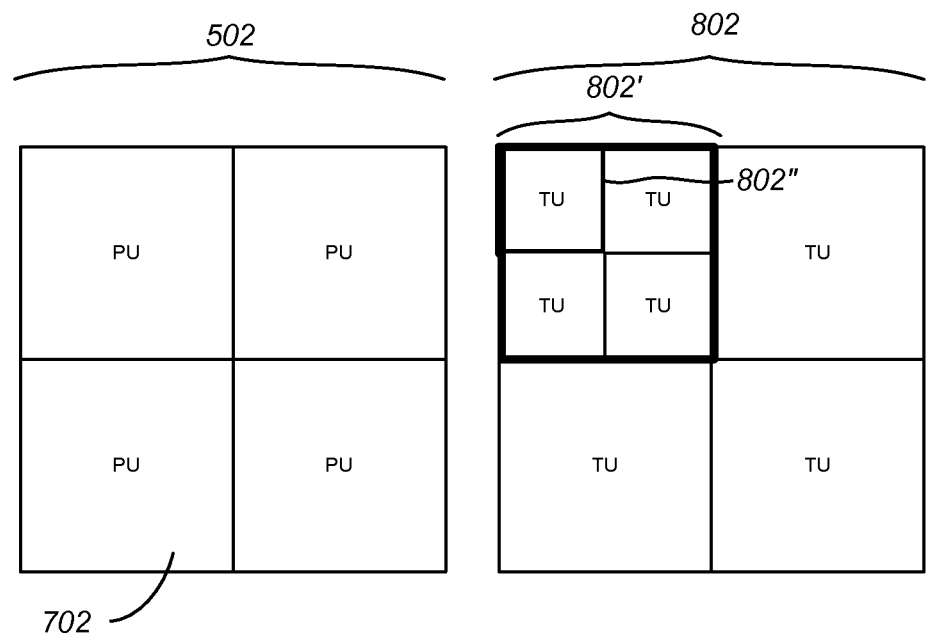
FIG. 8 is a diagram showing a coding unit partitioned into four prediction units and an associated set of transform units.

FIG. 8 is a diagram showing a CU 502 partitioned into four PUs 702 and a TU 802 that has been segmented into a plurality of other TUs 802 of lower hierarchical depth, including bolded TUs 802' and 802". TU 802" is at an immediately lower hierarchical depth than TU 802', and TU 802' is at an immediately lower hierarchical depth than TU 802. Similarly, TU 802 is hierarchically above (e.g. at an higher hierarchical depth) than TU 802' which is also at an immediately higher hierarchical depth than TU 802". TUs 802 are used to represent the elementary units that are spatially transformed by a DCT or similar transformation. The size and location of each block transform TU 802 within a CU 502 is described by a "residual" quadtree (RQT) further described below.

Figure 9:
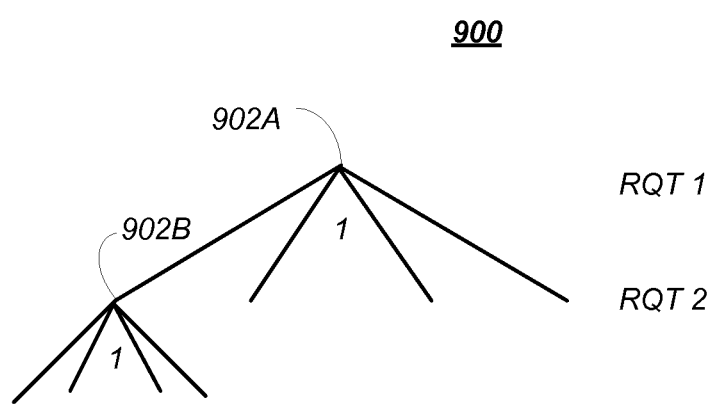
FIG. 9 is a diagram showing RQT codetree for the transform units associated with the coding unit in the example of FIG. 8.

FIG. 9 is a diagram showing RQT 900 for TU 802 associated with the CU 502 in the example of FIG. 8. Note that the "1" at the first node 902A of the RQT 900 indicates that TU 802 has four branches (indicating there are four TUs hierarchically below TU 802 such as TU 802') and that the "1" at the second node 902B at the adjacent lower hierarchical level indicates that the indicated node further has four branches (indicating that TU 802' has four TUs hierarchically below, such as TU 802". The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction), and are generated by the spatial predictor 324. Temporally predicted units are predicted from one temporal picture (e.g. P-frames) or predicted from at least two reference pictures temporally ahead and/or behind (i.e. B-frames).

Spatial Prediction

Figure 10:
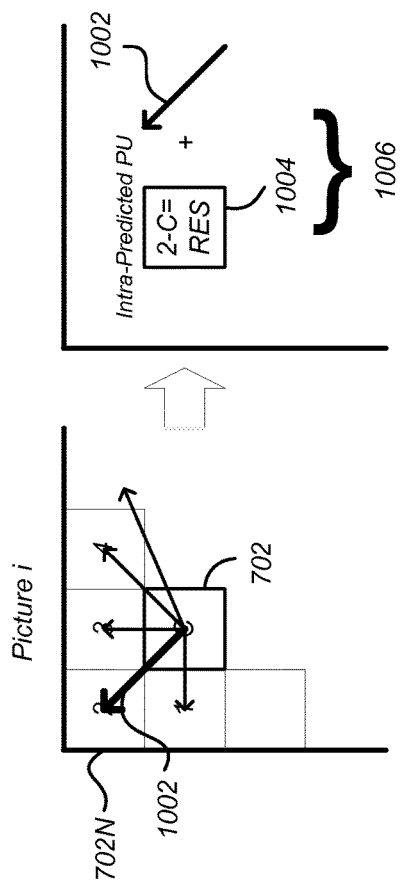
FIG. 10 is a diagram illustrating spatial prediction of prediction units.

FIG. 10 is a diagram illustrating spatial prediction of PUs 702. A picture may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 ($e$) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
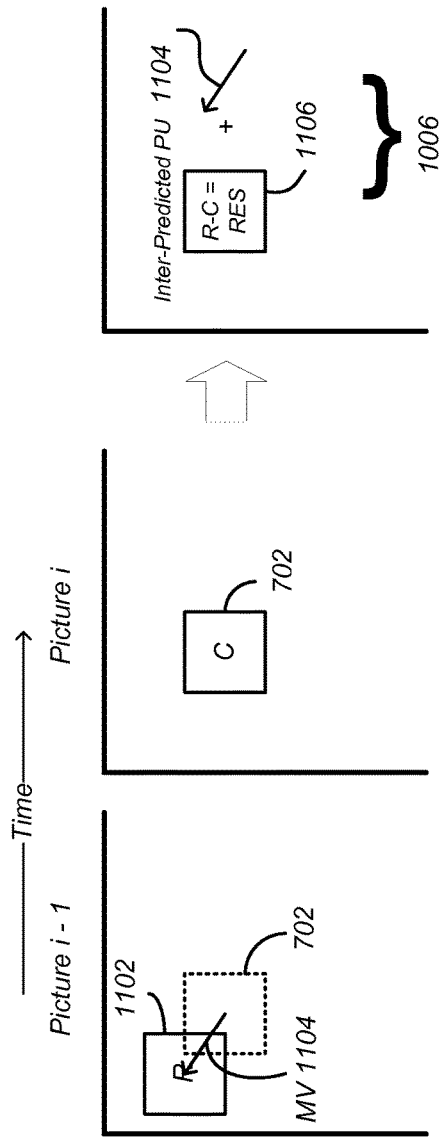
FIG. 11 is a diagram illustrating temporal prediction.

FIG. 11 is a diagram illustrating temporal prediction. Temporal prediction considers information from temporally neighboring pictures or frames, such as the previous picture, picture i−1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that is defines the displacement between the current PU 702 in current frame (picture i) and the reference area 1102 (refIdx) in the reference frame (picture i−1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1106. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
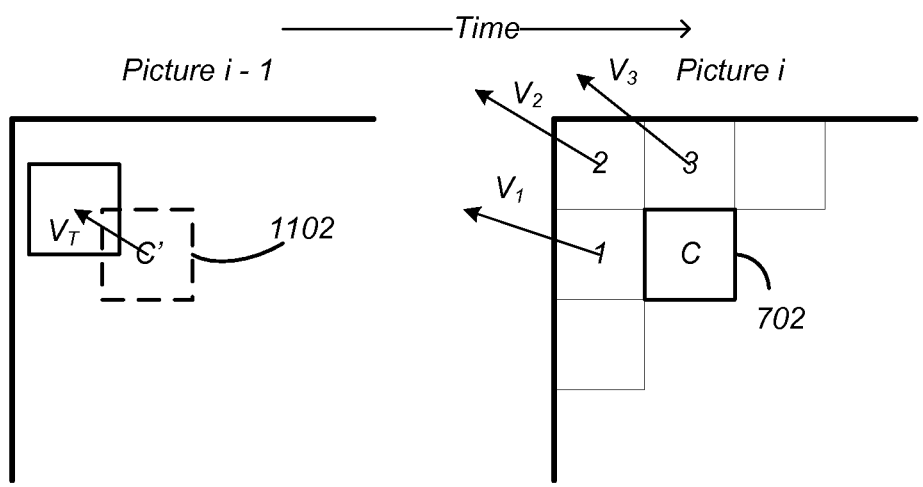
FIG. 12 is a diagram illustrating the use of motion vector predictors (MVPs)

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor $V_T$ which is the motion vector of the co-located block C' in a previously decoded picture (in decoding order) of the sequence (e. g. block of picture i−1 located at the same spatial position as the block being coded (block C of image i).

The components of the spatial motion vector predictors $V_1$, $V_2$ and $V_3$ and the temporal motion vector predictor $V_T$ can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) $V_T$ is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

Referring back to FIG. 3, the intra-predicted residuals 1004 and the inter-predicted residuals 1106 obtained from the spatial (intra) or temporal (inter) prediction process are then transformed by transform module 308 into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 310 as a part of the useful data coding the images of the AV information. Coding syntax elements may also be coded using spatial dependencies between syntax elements to increase the coding efficiency. HEVC offers context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

The filtered images, also known as reconstructed images, are then stored as reference images from reference image buffer 328 in order to allow the subsequent "Inter" predictions taking place during the compression of the subsequent images of the current video sequence.

HEVC Transform Tree Syntax

As described above, a CU can be recursively partitioned into transform blocks (TUs), with the dimensionally largest possible TU size is equal to the size of its associated CU. The partitioning itself is signaled by the residual quadtree (RQT) described above. Only square partitioning of CUs is defined, with flags signaling whether a given CU is split into four blocks of equal dimension.

A residual signal is coded for each CU in the form of one or more transform units TUs described above. HEVC supports four transform sizes: 4×4, 4×4, 8×8, 16×16 and 32×32. The CU is recursively split with the same quad-tree method as the CTB splitting, with the smallest allowable block being of course 4×4, the smallest TU. For example a 16×16 CU could contain three 8×8 TUs and four 4×4 TUs. For each luma TU there is a corresponding chroma TU of one quarter the size, so a 16×16 luma TU comes with two 8×8 chroma TUs Like the CUs in a CTB, TUs within a CU are also traversed in Z-order. If a TU has size 4×4, the encoder has the option to signal a so-called "transform skip" flag, where the transform is simply bypassed all together, and the transmitted coefficients are really just spatial residual samples.

TUs coefficients are coded in the bitstream differently than AVC. First, the bitstream signals a last xy position, indicating the position of the last coefficient in scan order. Then the decoder, starting at this last position, scans backwards until it reaches position 0,0, known as the DC coefficient. The coefficients are grouped into 4×4 coefficient groups. The coefficients are scanned diagonally (down and left) with each group, and the groups are scanned diagonally as well. For each group, the bitstream signals if it contains any coefficients. If so, it then signals a bit for each of the 16 coefficients in the group to indicate which are non-zero. Then for each of the non-zero coefficients in a group the remainder of the level is signaled. Finally the signs of all the non-zero coefficients in the group are decoded, and the decoder moves on to the next group. HEVC has an optional tool called sign bit hiding. If enabled and there are enough coefficients in the group, one of the sign bits is not coded, but rather inferred. The missing sign is inferred to be equal to the least significant bit of the sum of all the coefficient's absolute values. This means that when the encoder was coding the coefficient group in question and the inferred sign was not the correct one, it had to adjust one of the coefficients up or down to fix that. The reason this tool works is that sign bits are coded in bypass mode (not compressed) and thus are expensive to code. By not coding some of the sign bits, the savings more than makes for any distortion caused by adjusting one of the coefficients.

FIG. 13 is a diagram illustrating a transform tree syntax used to signal transform tree parameters in HEVC. In this diagram, indentation of the text indicates the logical structure of the syntax, wherein the delimiter "||" represents a logical "OR," "&&" represents a logical "AND," "!" represents a logical inverse or complement. Further, if a logical condition statement (e.g. "if" statement is true, the operations indented from the logical if statement (and enclosed in brackets "{ }" are performed, otherwise processing continues to the next logical statement. The parameters in this transform tree syntax are defined as follows:

log 2TrafoSize: A variable indicating the size of the current transform block. For example, for a 4×4 TU, log 2TrafoSize=2, and for an 8×8 TU, log 2TrafoSize=3.

Log 2MaxTrafoSize: A variable indicating the maximum transform unit (TU) dimension.

Log 2MinTrafoSize: A variable indicating the minimum transform unit (TU) dimension.

blkIdx: An index of the transform block (TB)

trafoDepth: A variable specifying the hierarchical depth of the current transform block or unit (TU) relative to the coding block or coding unit (CU). For example, if the TU and CU are of the same dimensional size, trafoDepth=0. The trafoDepth variable is also used as an array index for the split_transform_flag and the cbf_cb and cbf_cr flags, as further described below.

MaxTrafoDepth: A variable specifying the maximum hierarchical depth of the current transform block or unit (TU) relative to the coding block or coding unit. For example, if the TU can be no smaller than 4×4, and the associated CU is 16×16, the MaxTrafoDepth=2.

IntraSplitFlag: A flag determined from the partition mode of the current coding unit (CU). The Intra split flag is equal to zero in all cases except in the intra coding unit prediction mode and the partition mode is PART_N×N.

split_transform_flag[x0][y0][trafoDepth]: A flag indexed to x0, y0, and trafoDepth that specifies whether a block is split into four blocks with half horizontal and half vertical size for the purpose of transform coding. When split_transform_flag[x0][y0][trafoDepth] is not present, it is inferred as follows:

If one or more of the following conditions are true, the value of split_transform_flag[x0][y0][trafoDepth] is inferred to be equal to 1:

log 2TrafoSize is greater than Log 2MaxTrafoSize
IntraSplitFlag is equal to 1 and trafoDepth is equal to 0
interSplitFlag is equal to 1
Otherwise, the value of split_transform_flag[x0][y0][trafoDepth] is inferred to be equal to 0.

x0, y0: Array indices that specify the location of the top left luma sample of the block under consideration relative to the top-left luma sample for the entire picture. The array cbf_cb[x0][y0][trafoDepth]: A flag indexed to x0, y0, and trafoDepth. A value of 1 specifies that the Cb transform block contains one or more transform coefficient levels that are not equal to 0. The array indices x0, y0 specify the top-left location (x0, y0) of the considered TU. The variable trafoDepth is also used as an index that indicates the current subdivision level of a coding block into blocks for the purpose of transform coding. The index trafoDepth is equal to 0 for blocks that correspond to coding blocks When cbf_cb[x0][y0][trafoDepth] is not present, the value of cbf_cb[x0][y0][trafoDepth] is inferred as follows:

If trafoDepth is greater than 0 and log 2TrafoSize is equal to 2, cbf_cb[x0][y0][trafoDepth] is inferred to be equal to cbf_cb[xBase][yBase][trafoDepth−1]
Otherwise, cbf_cb[x0][y0][trafoDepth] is inferred to be equal to 0.

cbf_cr[x0][y0][trafoDepth]: A flag indexed to x0, y0, and trafoDepth. A value of 1 specifies that the Cr transform block contains one or more transform coefficient levels not equal to 0. The array indices x0, y0 specify the top-left location (x0, y0) of the considered transform unit. The index trafoDepth is also used as an index that specifies the current subdivision level of a coding block into blocks for the purpose of transform coding. When cbf_cr[x0][y0][trafoDepth] is not present, the value of cbf_cr[x0][y0][trafoDepth] is inferred as follows:

If trafoDepth is greater than 0 and log 2TrafoSize is equal to 2, cbf_cr[x0][y0][trafoDepth] is inferred to be equal to cbf_cr[xBase][yBase][trafoDepth−1]
Otherwise, cbf_cr[x0][y0][trafoDepth] is inferred to be equal to 0.

Coded block flags, cbf_cb[xBase][yBase][trafoDepth−1] and cbf_cr[xBase][yBase][trafoDepth−1], for above level (trafoDepth−1) Cb and Cr transform may be used to specify whether coded block flags, cbf_cb[xBase][yBase][trafoDepth] and cbf_cr[xBase][yBase][trafoDepth], for current level Cb and Cr transform will be present.

Turning now to FIG. 13, item 1302 is a logical statement of the transform tree descriptor, and includes variables x0, y0, xBase, yBase, log 2TrafoSize, trafoDepth, and blkIdx. Items 1304 and 1306 are logical statements controlling when the split_transform_flag is read. The split_transform_flag is read if (1) the size of the current transform block (indicated by log 2TrafoSize) is less than or equal to the maximum transform unit size (indicated by Log 2MaxTrafoSize), (2) the size of the current transform block is greater than the minimum transform block size (indicated by Log 2MaxTrafoSize), (3) hierarchical depth of the current transform block (indicated by trafoDepth) is less than the maximum hierarchical depth (indicated by MaxTrafoDepth) and (4) the logical inverse of the IntraSplitFlag and the hierarchical depth of the current transform is zero. Processing is then directed to logical statements 1308-1316, which control the reading of flags indicating whether the Cb transform block and the Cr transform block have one or more transform coefficient levels that are not equal to zero.

Logical statement 1308 determines if size of the current transform block (log 2TrafoSize) is greater than two (e.g. the current transform block is not greater than 4×4). If the size of the current transform block under consideration is two or less (e.g. it is of a 4×4 dimension or less) processing is routed to logical statement 1320, and the values of cbf_cb and cbf_cr are inferred as described above. If the size of the current transform block is greater than two (e.g. the current transform block is 8×8, 16×16 or otherwise greater than 4×4, logical statements 1310-1316 are performed.

Logical statement 1310 determines if the hierarchical depth of the current transform block under consideration equal to zero (e.g. the size of the current transform block is the same as the associated CU), or if the value of the cbf_cb flag indexed at [x0][y0][trafoDepth−1] (indicating the Cb transform block hierarchically higher (above) than the current transform block) equals a logical one.

If either test is positive, the cbf_cb flag for the current transform block is read, as shown in logical statement 1312. The first test indicates that the transform block is the same size as the CU and a conclusion regarding whether there are non-zero coefficients in the transform block cannot be made using other transform blocks in the same CU. Accordingly, the cbf_cb flag is read to determine whether there are non-zero coefficients in the transform block. The second test indicates that if it is known that the Cb transform block for the hierarchically higher (and dimensionally larger) Cb transform block has all zeros, it can be inferred that the Cb transform block for the current hierarchical depth likewise has all zero coefficients. However, if the hierarchically shallower Cb transform block has some non-zero coefficients, the Cb transform block at the current hierarchical depth may or may not include non-zero coefficients, and the cbr_cr flag must be read for further signaling purposes.

For example, consider the TU 802 illustrated in FIG. 8. Assuming the TU 802 is the same dimension as it's associated CU, the trafoDepth of TU 802 is 0. Similarly, the trafoDepth of TU 802' is 1, and the trafoDetph of TU 802" is 2. If TU 802" is the transform unit currently under consideration, "trafoDepth−1" refers to the transform unit hierarchically immediately above the TU 802", or TU 802'. The indexed flag cbf_cb[xBase][yBase][trafoDepth−1] becomes cbf_cb[xBase][yBase][1], which is a flag indicating if the Cb transform block for the immediately higher Cb block indicating whether that transform block has all zeros. If the indexed flag has a value of one (cbf_cb[xBase][yBase][trafoDepth−1]=1), it is known that TU 802' had non-zero coefficients, and hence no inference can be made regarding whether TU 802" had non zero coefficients or not. Consequently, the cbr_cr flag (cbf_cb[x0][y0][trafoDepth]) must be read. However, if the indexed flag has a value of zero (cbf_cb[xBase][yBase][trafoDepth−1]=1), it is known that TU 802' has all zero coefficients, and hence, it can be inferred that the Cb transform block associated with TU 802" must also have all zero coefficients. In this case, there is no need to read the cbr_cr flag (cbf_cb[x0][y0][trafoDepth]).

Logical statements 1314 and 1316 operate analogously to those of logical statements 1310 and 1312, but perform the tests and read flags associated with the Cr transform block. Logical statement 1318 indicates the end of the logic executed if logical statement 1308 tests true. The remaining logical statements 1320-1344 reflect other transport tree syntax.

In the current HEVC, the trafoDepth variable can be zero or greater than zero. When trafoDepth is equal to zero, the index of "traforDepth-1" in the arrays of cbf_cb[xBase][yBase][trafoDepth-1] and cbf_cr[xBase][yBase][trafoDepth-1] become "-1", which is an invalid array dimension and may cause confusion.

FIG. 14 is a diagram illustrating an improved transform tree syntax. The improved transform tree syntax includes logical statements 1302-1308 and 1320-1344 of the baseline transform tree syntax. However, in the improved transform tree syntax, logical statement 1310 is replaced by two logical statements 1402 and 1406, each associated with its own logical statements reading the indexed cbf_cb flag (1404 and 1408). Furthermore, logical statement 1314 is replaced by two logical statements 1410 and 1414, each with its own logical statements reading the indexed cbf_cb flag (1412 and 1416). Invalid array dimensions are prevented separating the baseline logical structures into conditional else structures. For example, logical statement 1402 tests to determine whether the trafoDepth variable is zero. If it is zero, the cbf_cb flag indexed by the appropriate location (x0, y0) and trafoDepth is read, but steps 1406 and 1408 are skipped, thus avoiding the use of an invalid array dimension. Also, if the trafoDepth variable does not test to be zero, it has a value of at least one (trafoDepth is constrained to be a positive integer) logical statement 1404 is skipped and processing is directed to statement 1406 and 1408. While statement 1406 involves the subtraction of 1 from the trafoDepth variable, logic only performs this step if the test in logical statement 1402 is negative (e.g. trafoDepth is an integer greater than 0).

Logical statements 1410-1416 are analogous operations applied to the cbf_cr indexed flag.

Figure 15:
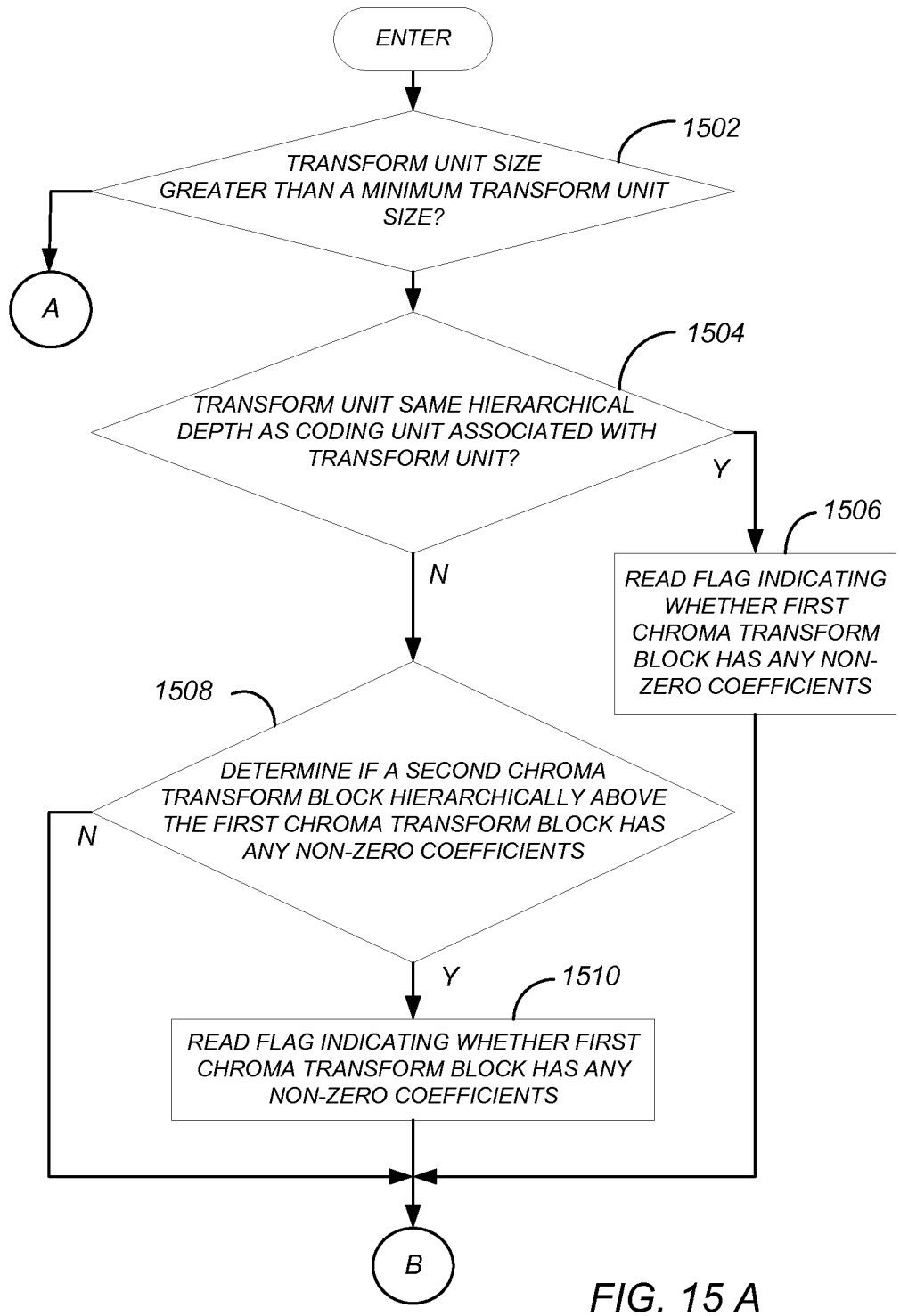
FIGS. 15A and 15B are flow charts illustrating the improved transform tree syntax.
Figure 15:
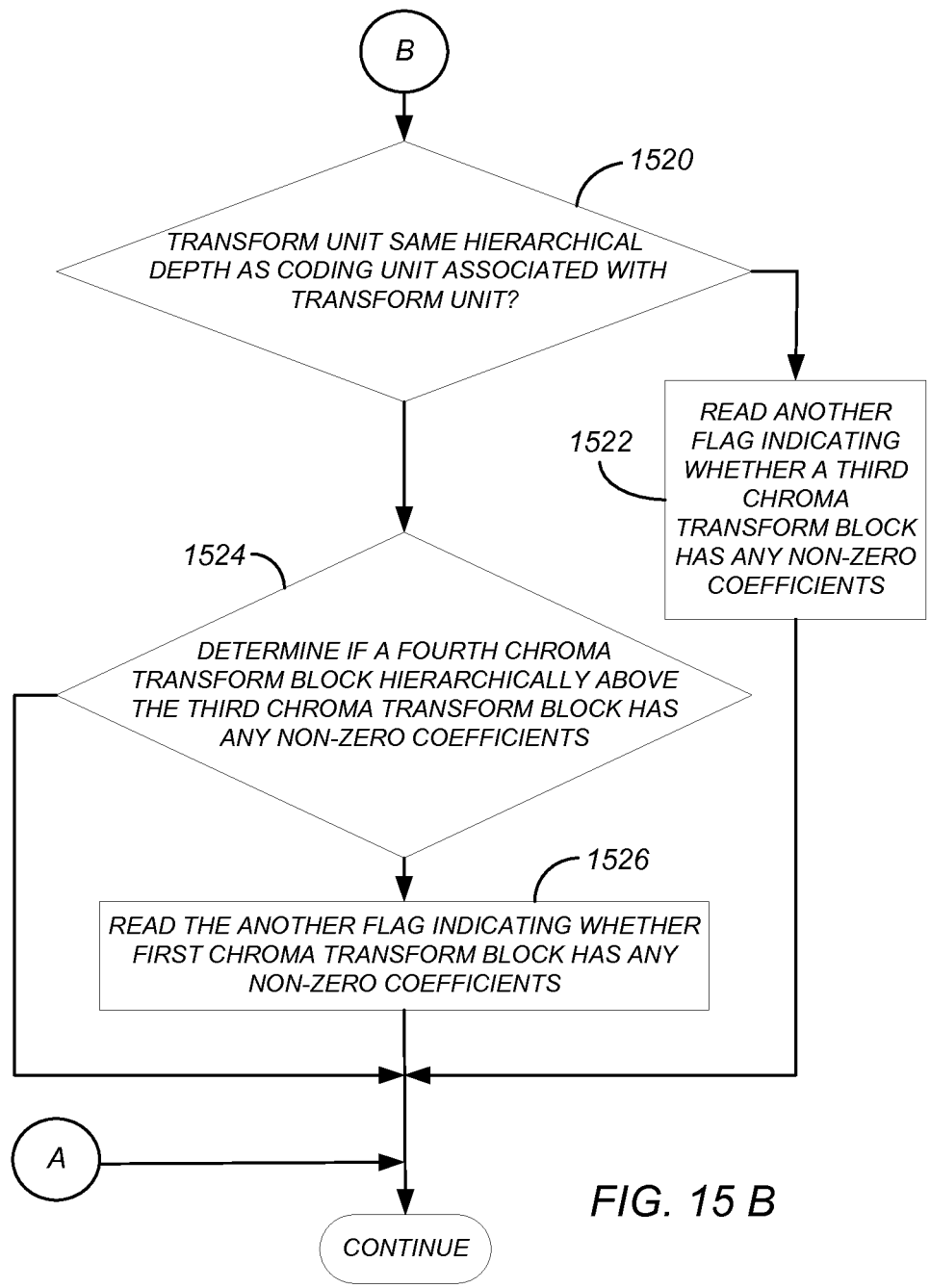

FIGS. 15A and 15B are flow charts illustrating the foregoing operations. Block 1502 illustrates the operation performed in logical instruction 1308, and determines whether the transform unit dimensional size is greater than a minimum transform size. The "minimum transform size" in this context is not the globally minimum transform size specified by the variable log 2MinTrafosize described above, but a minimum transform size for purposes of reading the chroma transform flags cbf_cb and cbf_cr as further described below. In the illustrated embodiment, the minimum transform size is greater than two, which corresponds to a transform of at least 8×8 dimension (e.g. log 2TrafoSize is at least 3).

Block 1504 illustrates the operation performed by logical instruction 1402, and determines whether the current transform unit is the same hierarchical depth as a coding unit (CU) associated with the transform unit. As shown in FIG. 14, this is indicated by the variable trafoDepth=0. If the current transform unit does not have the same hierarchical depth as the coding unit associated with the transform unit processing is routed to block 1508. If the current transform has the same hierarchical depth as the coding unit associated with the transform unit, processing is routed to block 1506, where a flag (in the illustrated embodiment, cbf_cb[x0][y0][trafoDepth]) is read indicating whether a first chroma block associated with the transform unit has any non-zero coefficients, as also illustrated by logical statement 1404. Processing is then passed to block 1520.

Block 1508 illustrates the operation performed by logical instruction 1406, and determines if a second chroma transform block of a higher adjacent hierarchical depth than the first chroma transform block has any non-zero coefficients. If this tests negative, processing is also routed to block 1520. If this tests positive, the flag indicating whether the first chroma block associated with the transform unit has any non-zero coefficients is read, as illustrated by logical statement 1406 and block 1510.

The logical structure disclosed above allows a positive result of block 1504 to route processing around block 1508. As implemented by use of the "if-else" logical statements 1402 and 1406, this prevents the value of trafoDepth-1 when trafoDepth=0, thus avoiding the result of a negative index.

Turning now to FIG. 15B, similar operations to those of blocks 1504-1510 are performed with respect to the cbf_cr [x0][y0][trafoDepth] flag. Block 1520 illustrates the operation performed in logical instruction 1410, and determines whether the current transform unit is the same hierarchical depth as a coding unit (CU) associated with the transform unit, again as indicated by the variable trafoDepth=0. If the current transform unit does not have the same hierarchical depth as the coding unit associated with the transform unit processing is routed to block 1524. If the current transform has the same hierarchical depth as the coding unit associated with the transform unit, processing is routed to block 1522, where a flag (in the illustrated embodiment, cbf_cr[x0][y0][trafoDepth]) is read indicating whether a first chroma block associated with the transform unit has any non-zero coefficients, as also illustrated by logical statement 1412. Processing then exits the routine (as illustrated in the logical statements of FIG. 14, processing is passed to other operations in the transform tree syntax, namely logical statement 1320).

Block 1524 illustrates the operation performed by logical instruction 1414, and determines if a second chroma transform block of a higher hierarchical depth than the first chroma transform block has any non-zero coefficients. If this tests negative, processing exits the routine. If this tests positive, the flag indicating whether the first chroma block associated with the transform unit has any non-zero coefficients (cbf_cr[x0][y0][trafoDepth]) is read, as illustrated by logical statement 1416 and block 1526.

Hence, by avoiding use of a single logical statement having two operands (e.g. the logical "if" statement 1310 with operands trafoDepth==0 and cbf_cb[xBase][yBase][trafoDepth-1]) and instead using two mutually exclusive logical statements with a single operand (e.g. if(trafoDepth==0) and else if (cbf_cb[xBase][yBase][trafoDepth-1], the transform tree syntax does attempt to use a negative index (trafoDepth-1 where trafoDepth=0).

Hardware Environment

Figure 16:
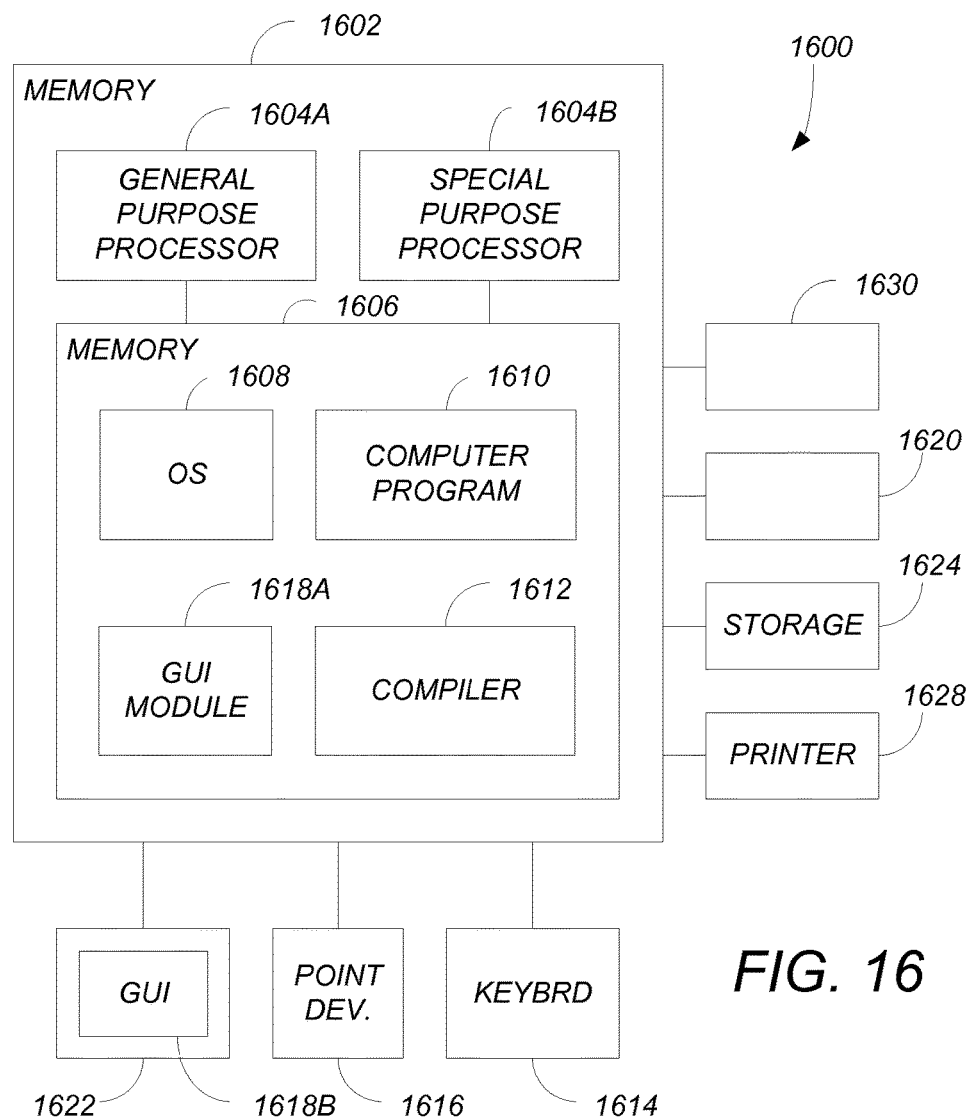
FIG. 16 illustrates an exemplary processing system that could be used to implement the embodiments of the invention.

FIG. 16 illustrates an exemplary processing system 1600 that could be used to implement the embodiments of the invention. The computer 1602 comprises a processor 1604 and a memory, such as random access memory (RAM) 1606. The computer 1602 is operatively coupled to a display 1622, which presents images such as windows to the user on a graphical user interface 1618B. The computer 1602 may be coupled to other devices, such as a keyboard 1614, a mouse device 1616, a printer, etc. Of course, those skilled in the art will recognize that any combination of the above components, or any number of different components, peripherals, and other devices, may be used with the computer 1602.

Generally, the computer 1602 operates under control of an operating system 1608 stored in the memory 1606, and interfaces with the user to accept inputs and commands and to present results through a graphical user interface (GUI) module 1618A. Although the GUI module 1618A is depicted as a separate module, the instructions performing the GUI functions can be resident or distributed in the operating system 1608, the computer program 1610, or implemented with special purpose memory and processors. The computer 1602 also implements a compiler 1612 which allows an application program 1610 written in a programming language such as COBOL, C++, FORTRAN, or other language to be translated into processor 1604 readable code. After completion, the application 1610 accesses and manipulates data stored in the memory 1606 of the computer 1602 using the relationships and logic that was generated using the compiler 1612. The computer 1602 also optionally comprises an external communication device such as a modem, satellite link, Ethernet card, or other device for communicating with other computers.

In one embodiment, instructions implementing the operating system 1608, the computer program 1610, and the compiler 1612 are tangibly embodied in a computer-readable medium, e.g., data storage device 1620, which could include one or more fixed or removable data storage devices, such as a zip drive, floppy disc drive 1624, hard drive, CD-ROM drive, tape drive, etc. Further, the operating system 1608 and the computer program 1610 are comprised of instructions which, when read and executed by the computer 1602, causes the computer 1602 to perform the steps necessary to implement and/or use the invention. Computer program 1610 and/or operating instructions may also be tangibly embodied in memory 1606 and/or data communications devices 1630, thereby making a computer program product or article of manufacture. As such, the terms "article of manufacture," "program storage device" and "computer program product" as used herein are intended to encompass a computer program accessible from any computer readable device or media.

The processing system 1600 may also be embodied in a desktop, laptop, tablet, notebook computer, personal data assistant (PDA), cellphone, smartphone, or any device with suitable processing and memory capability. Further, the processing system 1600 may utilize special purpose hardware to perform some or all of the foregoing functionality. For example the encoding and decoding processes described above may be performed by a special purpose processor and associated memory.

Those skilled in the art will recognize many modifications may be made to this configuration without departing from the scope of the present disclosure. For example, those skilled in the art will recognize that any combination of the above components, or any number of different components, peripherals, and other devices, may be used. For example, particular functions described herein can be performed by hardware modules, or a processor executing instructions stored in the form of software or firmware. Further, the functionality described herein can be combined in single modules or expanded to be performed in multiple modules.

CONCLUSION

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:
1. In a processing device for decoding a sequence of a plurality of pictures, each of the pictures partitionable into one or more coding units, each coding unit coded at least in part according to at least one transform unit as specified in a transform tree, a method of processing the sequence, comprising:
receiving a bitstream comprising the sequence of the plurality of pictures;
partitioning each of the pictures into one or more coding units;
determining, by the processing device, if a size of the transform unit is greater than a minimum transform unit size;
if the transform unit size is greater than the minimum transform unit size:
determining, by the processing device, if the transform unit is at a same hierarchical depth as the coding unit associated with the transform unit;
if the transform unit is at the same hierarchical depth as the associated coding unit, reading, in a first logical statement executed by the processing device, a flag indicating whether a first chroma transform block has any non-zero coefficients;
if the transform unit is not at the same hierarchical depth as the associated coding unit, determining, by the processing device, if a second chroma transform block hierarchically above the first chroma transform block has any non-zero coefficients; and
if the second chroma transform block hierarchically above the first chroma transform block has any non-zero coefficients, reading, in a second logical statement executed by the processing device, the flag indicating whether the second chroma transform block has any non-zero coefficients; and
decoding a sign of any non-zero coefficients indicated by the flag.
2. The method of claim 1, wherein:
the second chroma transform block comprises a Cb transform block describing a first set of chroma coefficients;
the flag is a flag describing whether any coefficients of the Cb transform unit are non-zero.
3. The method of claim 1, wherein:
the second chroma transform block comprises a Cr transform block describing a second set of chroma coefficients; and
the flag is a flag describing whether any coefficients of the Cr transform block are non-zero.
4. The method of claim 1, further comprising:
determining, from the transform tree syntax, if the transform unit is at the same hierarchical depth as the coding unit associated with the transform unit;
if the transform unit is at the same hierarchical depth as the associated coding unit, reading, in a third logical statement, another flag indicating whether a third chroma transform block has any non-zero coefficients;
if the transform unit is not at the same hierarchical depth as the associated coding unit, determining, from the transform tree syntax, if a fourth chroma transform block hierarchically above the third chroma transform block has any non-zero coefficients; and if the fourth chroma transform block hierarchically above the third chroma transform block has any non-zero coefficients, reading, in a second logical statement, the another flag indicating whether the fourth chroma transform block has any non-zero coefficients.

5. The method of claim 4, wherein:
the flag is a cbf_cb flag; and
the another flag is a cbf_cr flag.

6. The method of claim 1, wherein:
the determining if the transform is at a same hierarchical depth as the coding unit associated with the transform unit is performed in a third logical statement; and
the determining if the second chroma transform block hierarchically above the first chroma transform block has any non-zero coefficients is performed in a fourth logical statement.

7. The method of claim 6, wherein:
the third logical statement is an if statement with a single operand; and
the fourth logical statement is an else statement with a single operand.

8. The method of claim 1, wherein:
the transform unit is determined to be at a same hierarchical depth as the coding unit associated with the transform unit according to a variable of the transform tree syntax; and
the second chroma transform block of hierarchically above the first chroma transform block is determined from an decremented index based on the variable of the transform tree syntax.

9. An apparatus for decoding a sequence of a plurality of pictures, each of the pictures partitionable into one or more coding units, each coding unit coded at least in part according to at least one transform unit as specified in a transform tree, the apparatus comprising:
a processor;
a memory, communicatively coupled to the processor, the memory storing instructions comprising instructions for:
receiving a bitstream comprising the sequence of the plurality of pictures;
partitioning each of the pictures into one or more coding units;
determining, by the processing device, if a size of the transform unit is greater than a minimum transform unit size;
if the transform unit size is greater than the minimum transform unit size:
determining, by the processing device, if the transform unit is at a same hierarchical depth as the coding unit associated with the transform unit;
if the transform unit is at the same hierarchical depth as the associated coding unit, reading, in a first logical statement executed by the processing device, a flag indicating whether a first chroma transform block has any non-zero coefficients;
if the transform unit is not at the same hierarchical depth as the associated coding unit, determining, by the processing device, determining if a second chroma transform block hierarchically above the first chroma transform block has any non-zero coefficients; and if the second chroma transform block hierarchically above the first chroma transform block has any non-zero coefficients, reading, in a second logical statement executed by the processing device, the flag indicating whether the second chroma transform block has any non-zero coefficients; and
decoding a sign of any non-zero coefficients indicated by the flag.

10. The apparatus of claim 9, wherein:
the second chroma transform block comprises a Cb transform block describing a first set of chroma coefficients;
the flag is a flag describing whether any coefficients of the Cb transform unit are non-zero.

11. The apparatus of claim 9, wherein:
the second chroma transform block comprises a Cr transform block describing a second set of chroma coefficients; and
the flag is a flag describing whether any coefficients of the Cr transform block are non-zero.

12. The apparatus of claim 9, further comprising:
determining, from the transform tree syntax, if the transform unit is at the same hierarchical depth as the coding unit associated with the transform unit;
if the transform unit is at the same hierarchical depth as the associated coding unit, reading, in a third logical statement, another flag indicating whether a third chroma transform block has any non-zero coefficients;
if the transform unit is not at the same hierarchical depth as the associated coding unit, determining, from the transform tree syntax, if a fourth chroma transform block hierarchically above the third chroma transform block has any non-zero coefficients; and
if the fourth chroma transform block hierarchically above the third chroma transform block has any non-zero coefficients, reading, in a second logical statement, the another flag indicating whether the fourth chroma transform block has any non-zero coefficients.

13. The apparatus of claim 12, wherein:
the flag is a cbf_cb flag; and
the another flag is a cbf_cr flag.

14. The apparatus of claim 9, wherein:
the determining if the transform is at a same hierarchical depth as the coding unit associated with the transform unit is performed in a third logical statement; and
the determining if the second chroma transform block of hierarchically above the first chroma transform block has any non-zero coefficients is performed in a fourth logical statement.

15. The apparatus of claim 14, wherein:
the third logical statement is an if statement with a single operand; and
the fourth logical statement is an else statement with a single operand.

16. The method of claim 9, wherein:
the transform unit is determined to be at a same hierarchical depth as the coding unit associated with the transform unit according to a variable of the transform tree syntax; and
the second chroma transform block of hierarchically above the first chroma transform block is determined from an decremented index based on the variable of the transform tree syntax.

17. An apparatus for decoding a sequence of a plurality of pictures, each of the pictures partitionable into one or more coding units, each coding unit coded at least in part according to at least one transform unit as specified in a transform tree, the apparatus comprising:

means for receiving a bitstream comprising the sequence of the plurality of pictures;

partitioning each of the pictures into one or more coding units;

means for determining if a size of the transform unit is greater than a minimum transform unit size;

means for determining if the transform unit is at a same hierarchical depth as the coding unit associated with the transform unit if the transform unit size is greater than the minimum transform unit size;

means for reading, in a first logical statement, a flag indicating whether a first chroma transform block has any non-zero coefficients if the size of the transform unit is greater than a minimum transform unit size and if the transform unit is at the same hierarchical depth as the associated coding unit;

means for determining if a second chroma transform block hierarchically above the first chroma transform block has any non-zero coefficients if the size of the transform unit is greater than a minimum transform unit size and if the transform unit is not at the same hierarchical depth as the associated coding unit; and means for reading, in a second logical statement executed by the processing device, the flag indicating whether the first chroma transform block has any non-zero coefficients if the size of the transform unit is greater than a minimum transform unit size and if the second chroma transform block hierarchically above the second transform block has any non-zero coefficients; and means for decoding a sign of any non-zero coefficients indicated by the flag.

18. The apparatus of claim 17, wherein:
the second chroma transform block comprises a Cb transform block describing a first set of chroma coefficients;
the flag is a flag describing whether any coefficients of the Cb transform unit are non-zero.

19. The apparatus of claim 17, wherein:
the second chroma transform block comprises a Cr transform block describing a second set of chroma coefficients; and
the flag is a flag describing whether any coefficients of the Cr transform block are non-zero.

20. The apparatus of claim 17, wherein:
the transform unit is determined to be at a same hierarchical depth as the coding unit associated with the transform unit according to a variable of the transform tree syntax; and
the second chroma transform block hierarchically above than the first chroma transform block is determined from an decremented index based on the variable of the transform tree syntax.

* * * * *